United States Patent [19]

Leon

[11] 4,126,227
[45] Nov. 21, 1978

[54] RECORD FILING SYSTEM

[76] Inventor: Renato S. Leon, 116 S. Waldinger, Valley Stream, N.Y. 11580

[21] Appl. No.: 754,354

[22] Filed: Dec. 27, 1976

Related U.S. Application Data

[63] Continuation-in-part of Ser. No. 587,103, Jun. 16, 1975, abandoned.

[51] Int. Cl.² .............................................. B07C 5/12
[52] U.S. Cl. .................................. 209/611; 209/610
[58] Field of Search ............................ 209/80.5, 110.5

[56] References Cited

U.S. PATENT DOCUMENTS

| | | | |
|---|---|---|---|
| 3,557,948 | 1/1971 | Gerlach | 209/80.5 |
| 3,576,256 | 4/1971 | Tandeski | 209/80.5 |
| 3,669,262 | 6/1972 | Gerlach | 209/80.5 |
| 3,672,497 | 6/1972 | Lambert | 209/80.5 |
| 3,743,359 | 7/1973 | Schonfeld | 209/80.5 |

*Primary Examiner*—Allen N. Knowles
*Attorney, Agent, or Firm*—Stephen E. Feldman; Marvin Feldman

[57] ABSTRACT

A plurality of bar hooks are disposed in an array proximate the upper area of a file enclosure, and are each formed with a pair of oppositely extending arms. The arms, disposed for co-action with the ears forming the binary code on a plurality of edge coded files, are selectively actuateable to enable retrieval of selected ones of said files; even though the files have been returned to the enclosure in random order irrespective of any consecutive order of the numbering of said files. The enclosure carries one or more coding bars corresponding to a special edge code notched into the files to restrict return of the file to its proper enclosure. A latch bar extends along each side of the enclosure for co-operation with side notches provided in the files to support same out of contact with the arms of the bar hooks to facilitate actuation of the bar hooks for card retrieval. In some of the embodiments the bar hooks are supported by mounting plates which extend along the length of the bar hook. In other embodiments the bar hooks as well as the latch bars are moved into operative position by a cam plate that engages the bar hook and/or latch bar substantially along its length. The enclosure is further provided with a conveyor that carries the selected file to an outlet opening formed in the enclosure.

20 Claims, 36 Drawing Figures

FIG. 9
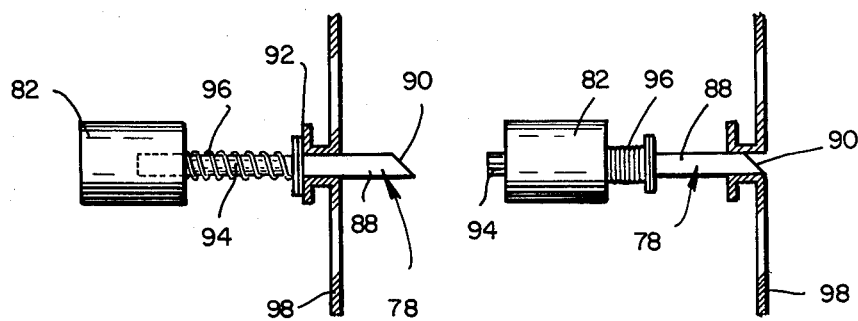
FIG. 10
FIG. 12
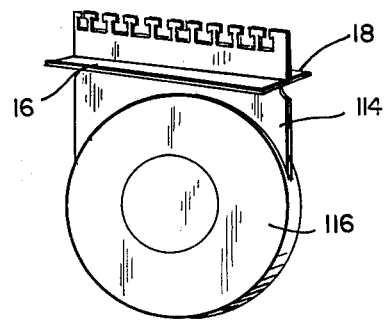
FIG. 11
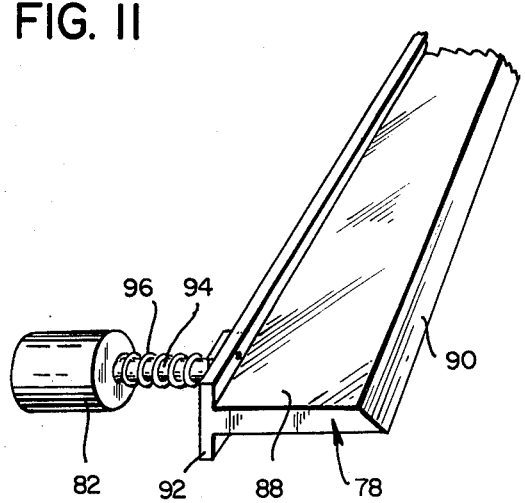

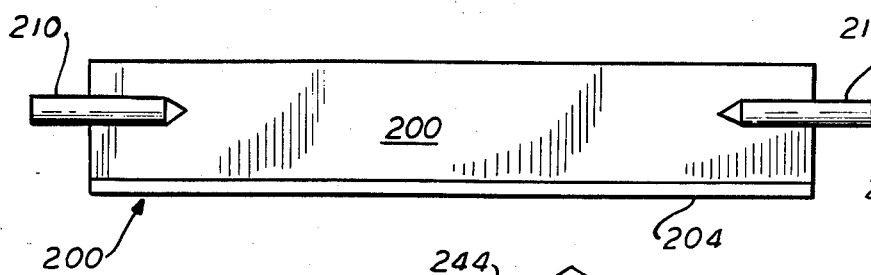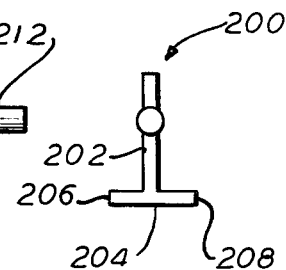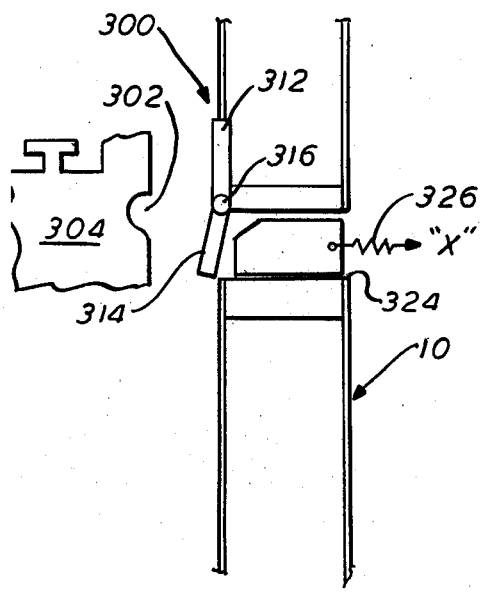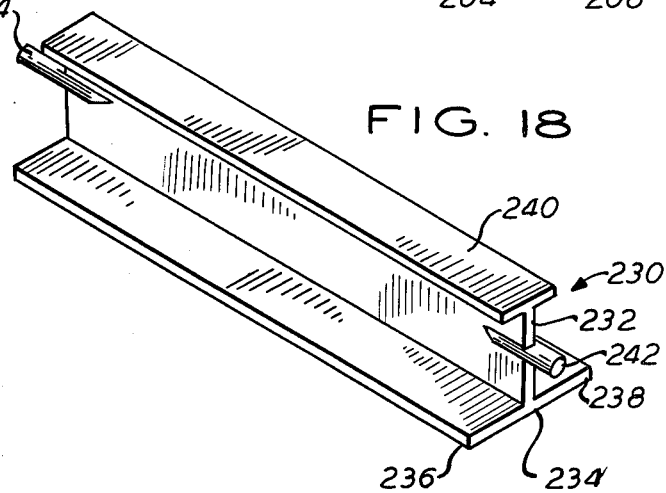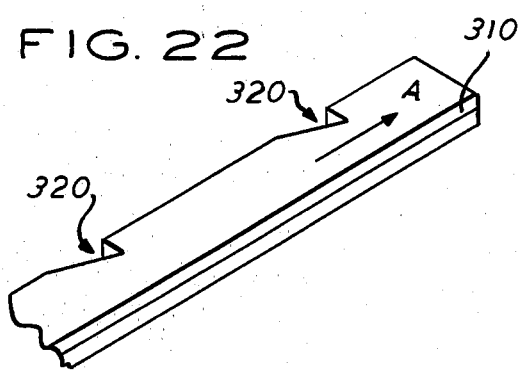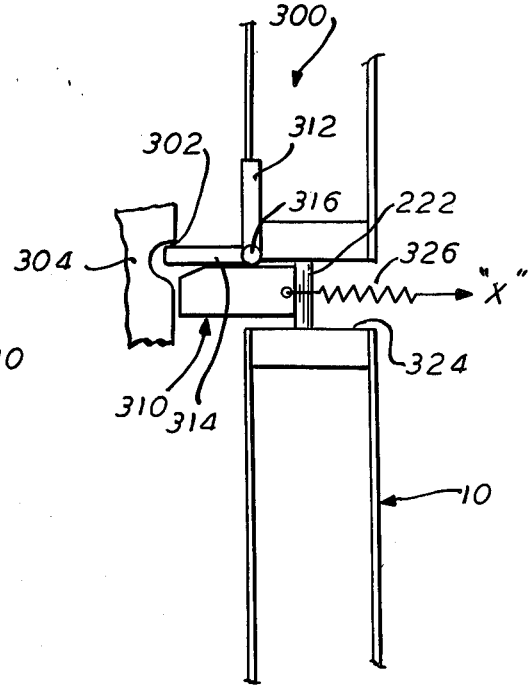

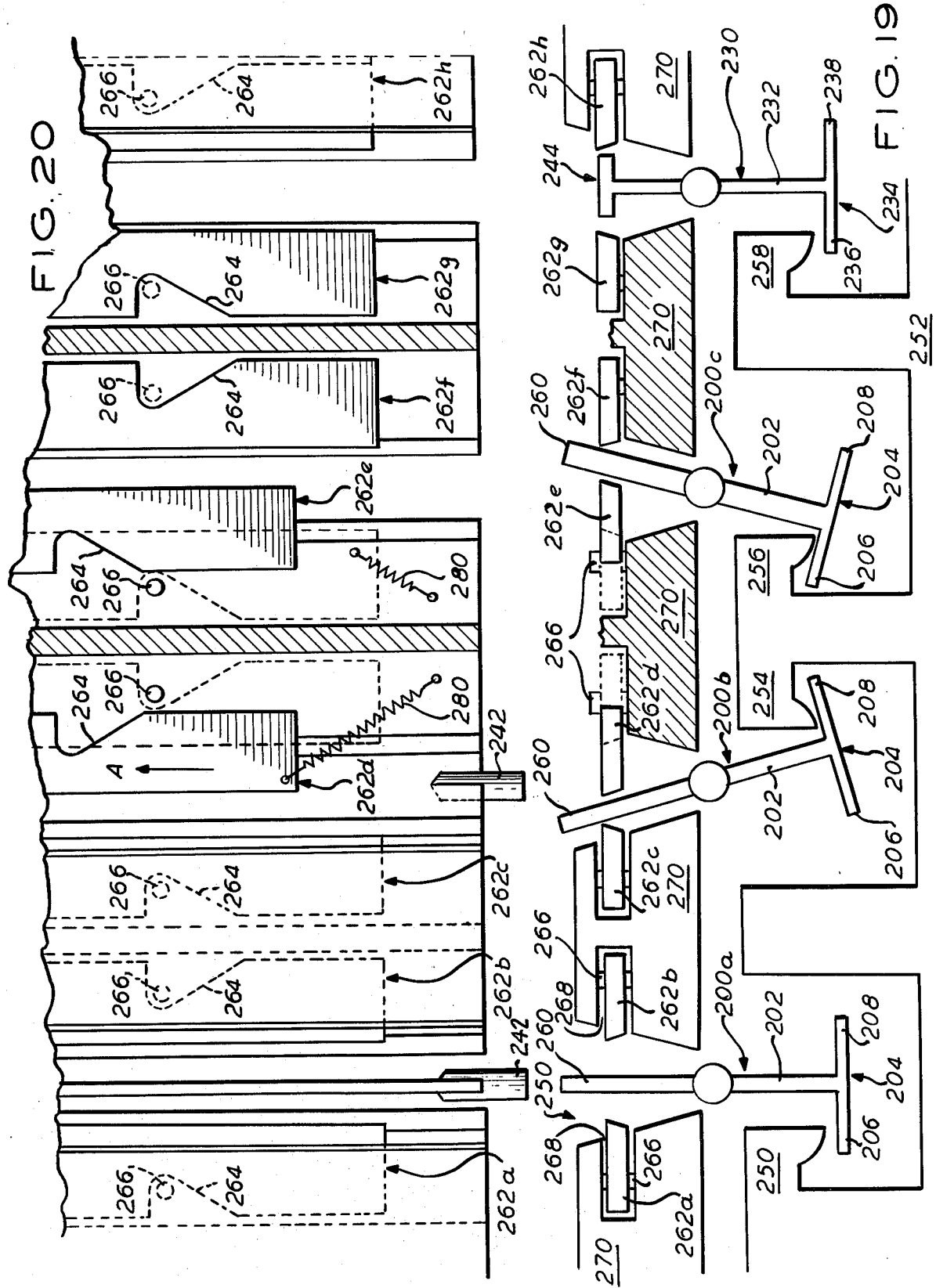

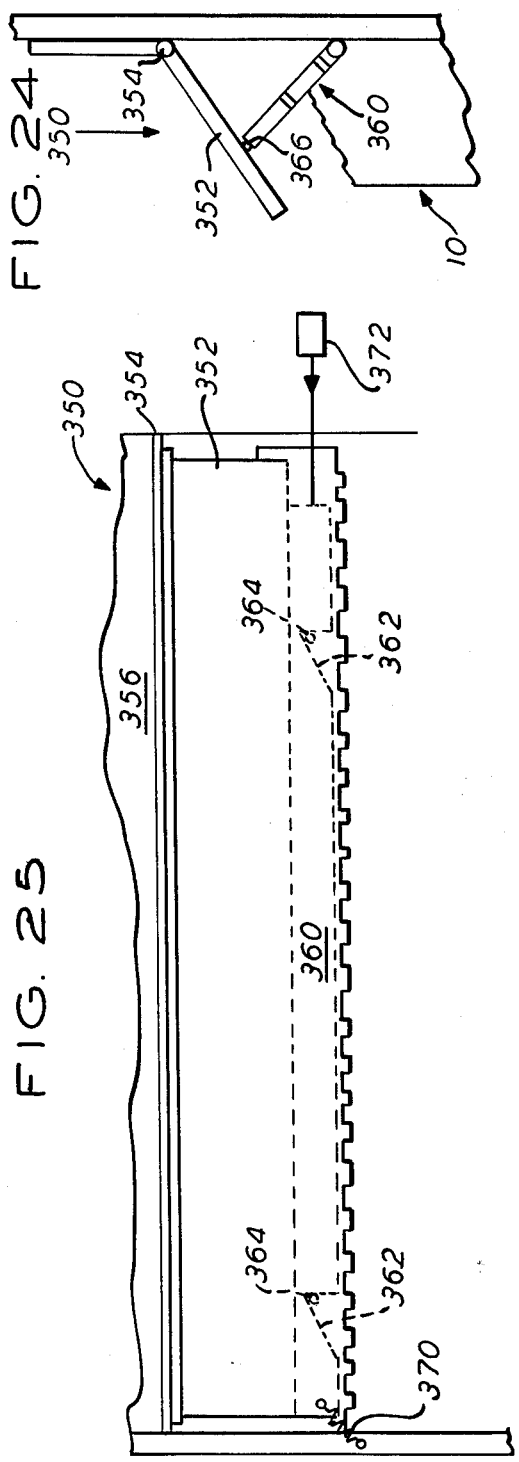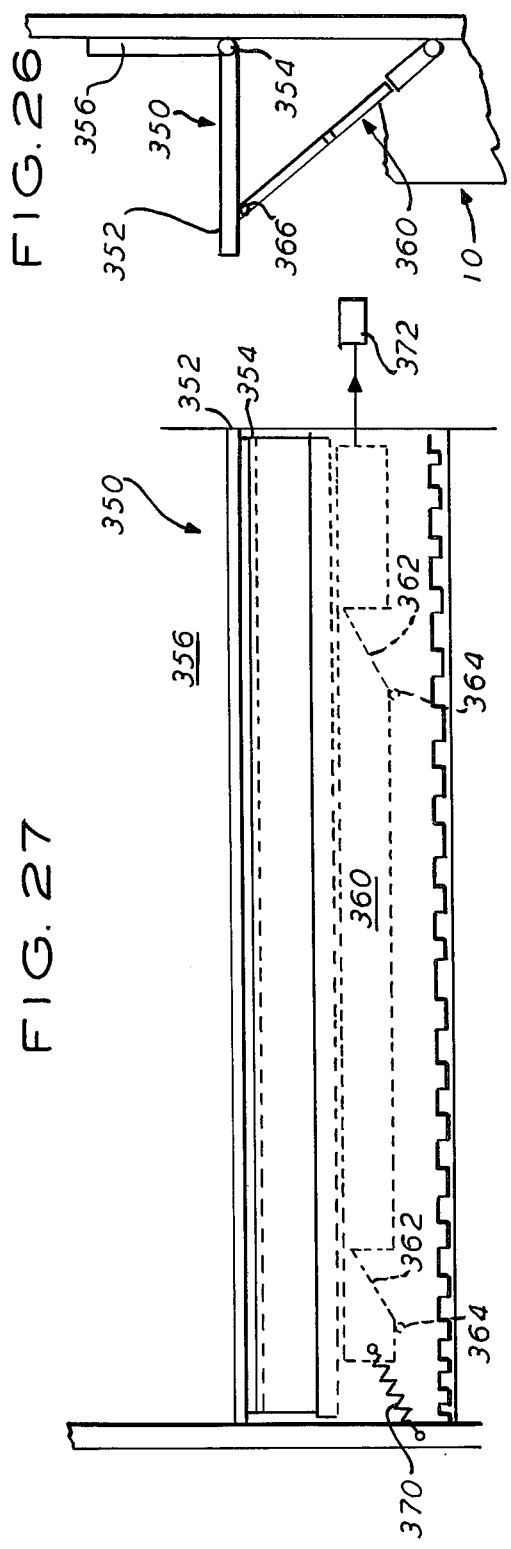

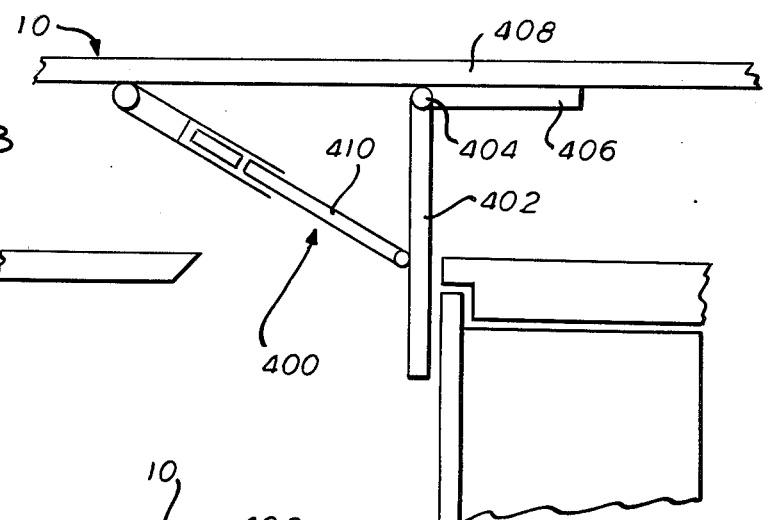
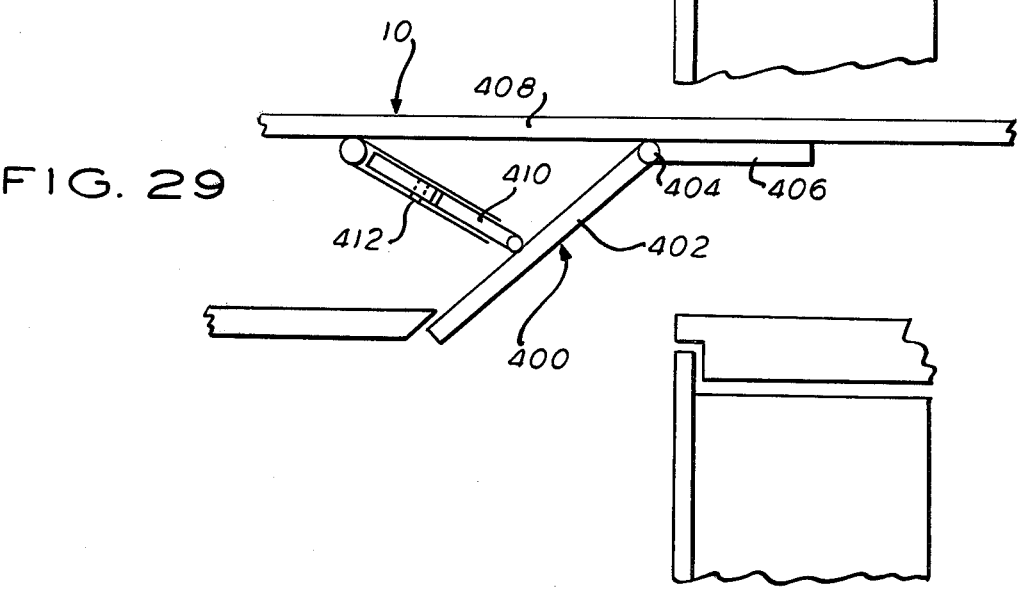
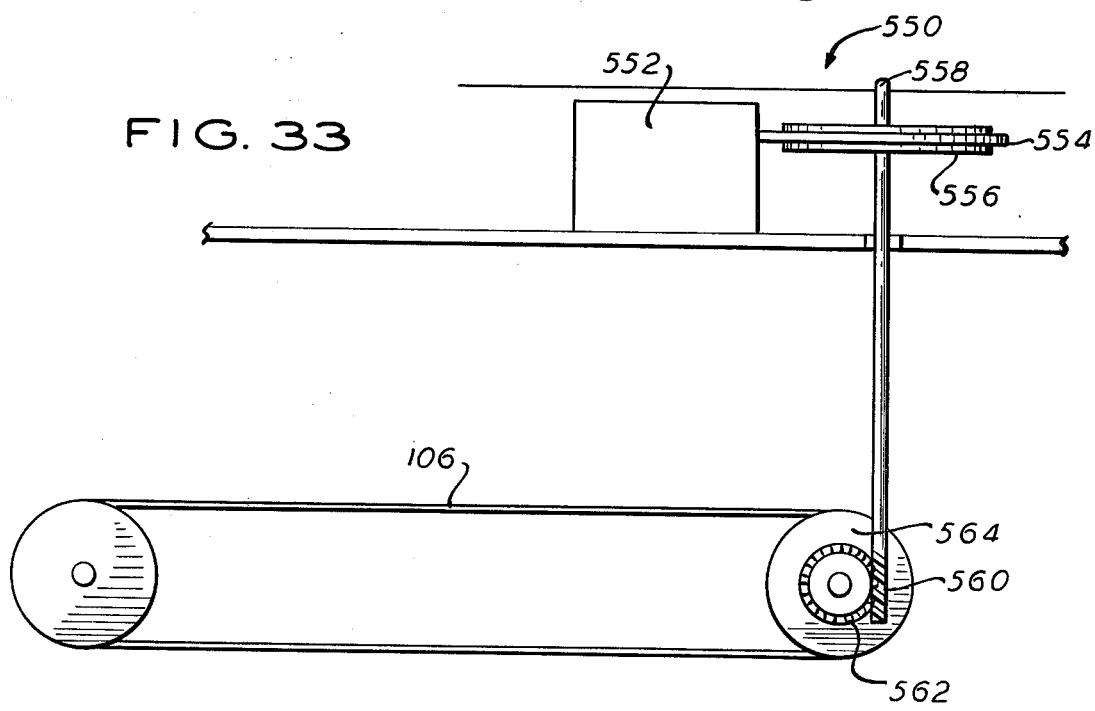

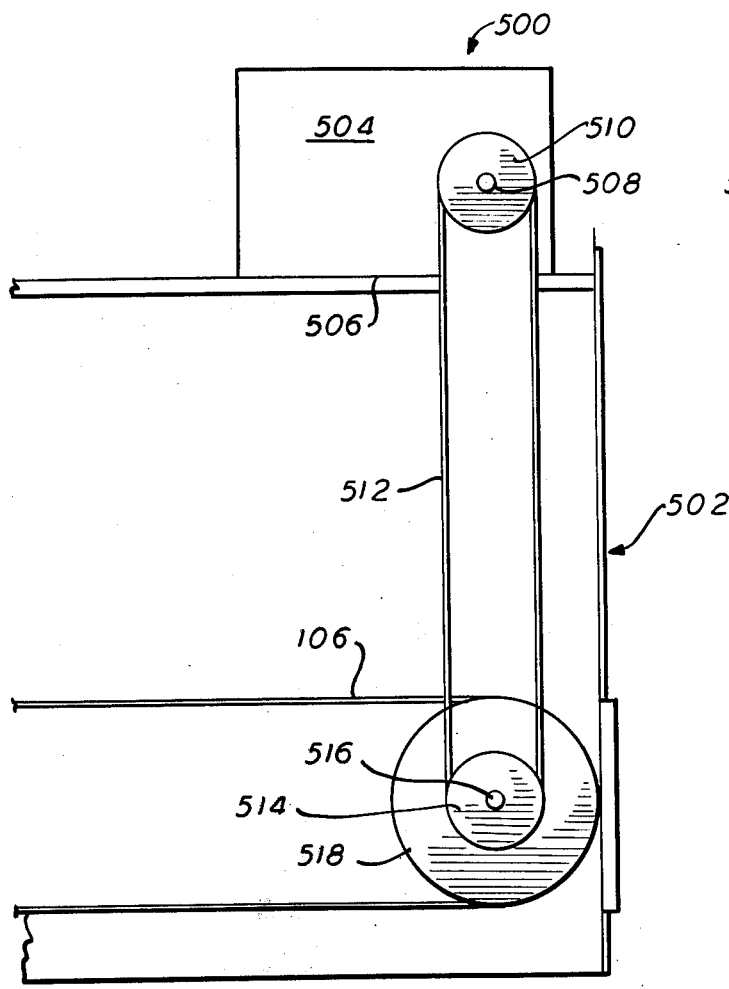
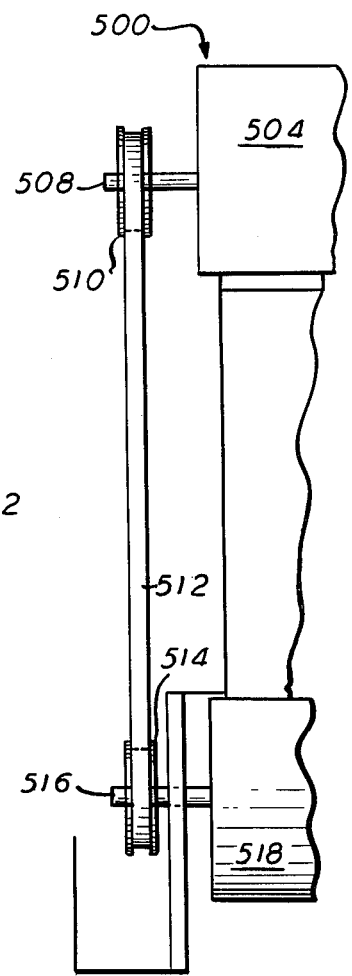
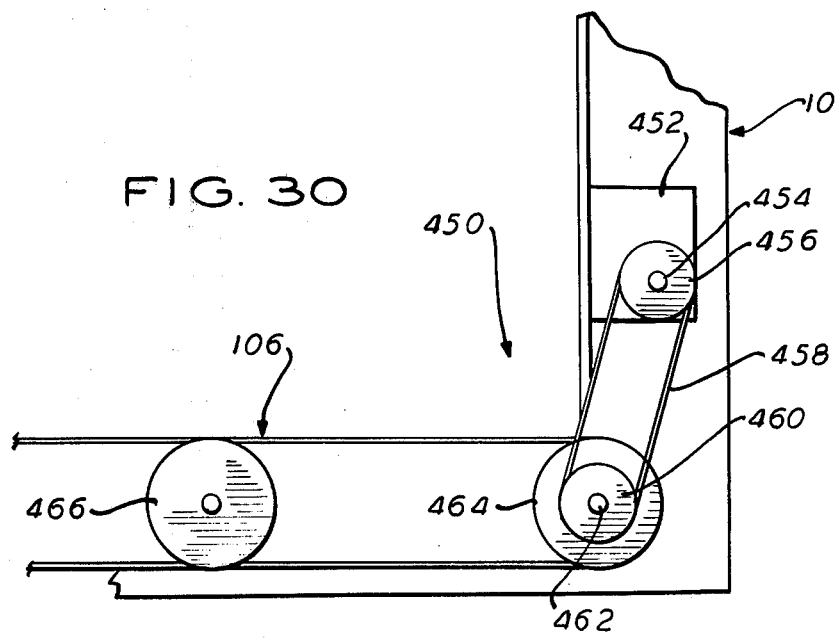

RECORD FILING SYSTEM

CROSS REFERENCE

This application is a continuation in part of U.S. application Ser. No. 587,103 filed 06/16/75, now abandoned.

The present invention relates to apparatus for storing files, and in particular to a novel and improved file storage apparatus which enables stored files to be located and retrieved automatically by feeding binary numerals assigned to the files into the system.

In industry today, where records, receipts, invoices, and other materials are constantly growing in volume, there is an increasing problem of filing multitudes of such records in as compact a form as possible, and at the same time keep such records accessible for rapid and convenient location and removal as needed. For purposes of fool-proof identification and location, it has been found desirable to arrange such records in accordance with a selected numbering system. Such consecutive identification of records, however, normally requires that the records be stored in chronological order, which often involves considerable difficulty and expenditure of time in locating a selected record for removal, and in replacing it in its chronological position. In addition, the storage of files and records in this manner normally requires a considerable amount of storage space with extendable drawers, racks or shelves, so that access may be had to all of the files.

It is an object of the present invention to provide a file storage assembly which includes means for automatically locating and removing selected files which are not stored in a sequenced order.

Another object of the invention is the provision of a file storage assembly of the type described in which a large number of file cards, capable of carrying all types of records, are closely stacked in a relatively small cabinet, thereby effecting a desirable economy in storage space required.

Still another object of the invention is to provide a file storage assembly of the type described which is capable of storing and retrieving not only printed records, but also magnetic tapes, microfilms, micro fiche or any other material which requires a filing system.

Still another object of the invention is the provision of a file storage assembly of the type described in which a series of index cards are mounted in association with retaining hooks, both the cards and hooks being coded according to assigned binary numerals, whereby when a selected binary numeral is fed to the system, the retaining hooks will be actuated to release for removal only that file card which has been coded with the same binary numeral.

Yet another object of the invention is to provide a file storage assembly of the type described in which the retaining hooks are hingedly supported by mounting plates which extend substantially along their lengths.

Yet another object of the invention is to provide a file storage assembly of the type described in which the retaining hooks are actuated by cam plates that extend substantially along the length of the retaining hook and act upon the retaining hooks to position same in a substantially positive manner.

Yet another object of the invention is to provide a file storage assembly of the type described in which latch bars cooperate with notches formed in the sides of the index cards to retain same out of contact with the retaining hooks to facilitate movement of the retaining hooks to selected positions.

Yet another object of the invention is to provide a file storage assembly of the type described in which the latch bars are actuated by cam plates that extend substantially along the length of the latch bar and act upon the latch bar to position same in a substantially positive manner.

Still a further object of the invention is to provide a file storage assembly of the type described in which a conveyor is provided for carrying a selected file out of the enclosure for the assembly and files.

A further object of the invention is to provide a file storage assembly of the character described in which the file cards may be stored in a random sequence within a file cabinet and yet may be instantly identified and removed by merely feeding the assigned numeral of a selected file card to a keyboard.

A further object of the invention is the provision of a file storage assembly of the character described in which coding means are provided to assure that removed records are refiled so that they face the correct side and so that they are replaced in their proper file cabinet.

In accordance with the invention there is provided a record filing assembly which includes a stationary support member, a plurality of elongated card selecting members mounted in a horizontal row on the support member and depending therefrom, and a plurality of aligned file cards mounted in a horizontal row beneath the support member. Each of the file cards has a series of holding portions, which may be in the form of cut-out notches, arranged in a row along its upper end, with the holding portions representing progressive binary values. Each card is also assigned an individual number.

Each of the holding portions has an "ON" location at one side thereof and an "OFF" location at the other side thereof, with holding means overlying the "OFF" location of those holding portions whose binary values are included in the assigned number of the card, and overlying the "ON" locations of the remainder of the holding portions on said card. Each of the card selecting members extends through a respective holding portion of each file card which have the same binary value.

Each of the card selecting members includes a pair of opposed retaining portions and is actuatable for alternative movement to a first position in which one retaining portion underlies the "ON" location and the other retaining portion is clear of the "OFF" location of its associated holding portion, or a second position in which said one retaining portion is clear of said "ON" location and the other retaining portion underlies said "OFF" location. Said assembly also includes means for moving all of the card selecting members simultaneously in a selected sequence in which one or more selecting members are moved to the first position and the remainder of the selecting members are moved to the second position, whereby to release one card having an assigned number which corresponds to said sequence.

Additional objects and advantages of the invention will become apparent during the course of the following specification, when taken in connection with the accompanying in which:

FIGS. 9 and 10 are enlarged sectional views showing the manner in which the latch bars of the assembly of FIG. 1 are brought to their extended and retracted positions, respectively;

FIG. 11 is an enlarged perspective view of a portion of the latch bar shown in FIGS. 9 and 10, and one of the actuating solenoids therefor;

FIG. 12 is a perspective view of a modified form of file card adapted to carry a reel of tape or micro-film;

FIG. 16 is a side elevational view of modified form of swinging bar hook;

FIG. 17 is an end elevational view of the swinging bar hook of FIG. 16;

FIG. 18 is a perspective view of a further modified form of swinging bar hook;

FIG. 19 is a schematic end elevational view showing the bar hooks of FIGS. 16 and 17 and the cam plates for operating same in the various positions thereof, as well as a showing of the bar hook of FIG. 18 positioned for co-operation with such cam plates, and all disposed in operative relationship with the notches in a file card;

FIG. 20 is a schematic plan view of the showing of FIG. 19;

FIG. 21 is a schematic end elevation of a modified form of latch bar assembly, showing same in position to release file cards for co-operation with the bar hooks;

FIG. 22 is a perspective of the cam plate for operating the latch bar of FIG. 21;

FIG. 23 is a schematic end elevation view on the latch bar assembly of FIG. 21 showing same in position to retain the file cards out of engagement with the bar hooks;

FIG. 24 is a schematic end elevation of a further modified form of latch bar assembly showing same in card releasing position;

FIG. 25 is a side elevation of the latch bar assembly of FIG. 24;

FIG. 26 is a showing of the latch bar assembly of FIG. 24 showing same in card retaining position;

FIG. 27 is a side elevation of the latch bar assembly of FIG. 26;

FIG. 28 is a schematic end elevation of another modified latch bar assembly showing same in card releasing position;

FIG. 29 is a schematic end view of the latch bar assembly of FIG. 28 showing same in card retaining position;

FIG. 30 is a schematic showing of the drive assembly for the conveyor belt for carrying the selected card out of the file cabinet;

FIG. 31 is a showing of a modified conveyor belt drive assembly;

FIG. 32 is an end elevational view of the conveyor belt drive assembly of FIG. 31; and FIG. 33 is a further modified form of conveyor belt drive assembly.

Figure 1:
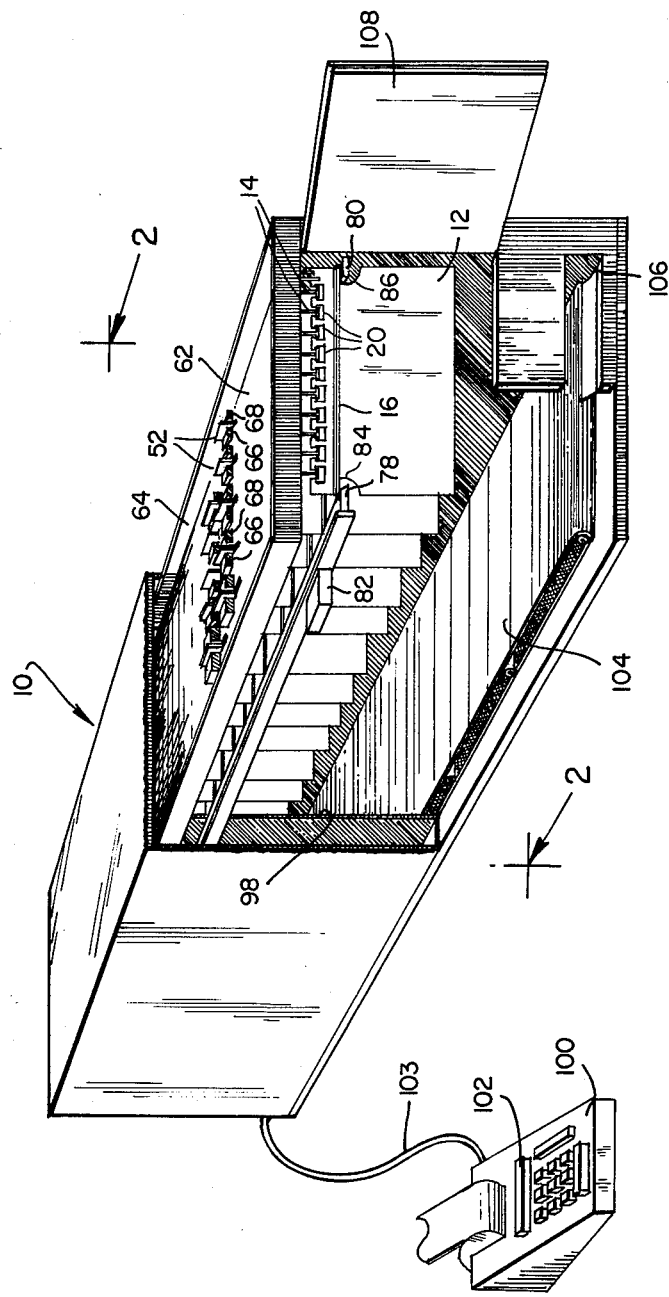
FIG. 1 is a perspective view of a file cabinet containing the filing assembly of the present invention, with portions thereof broken away and shown in section to reveal inner constructional detail.

Referring in detail to the drawings, there is shown in FIG. 1 one preferred embodiment of a filing system made in accordance with the present invention. The system is shown to include a file cabinet 10 within which are suspended a plurality of file cards 12. The file cards are supported by a row of bar hooks 14 which are individually movable in selected directions to release a chosen card according to binary numerals coded on each of the cards in a manner to be presently described.

Figure 6:
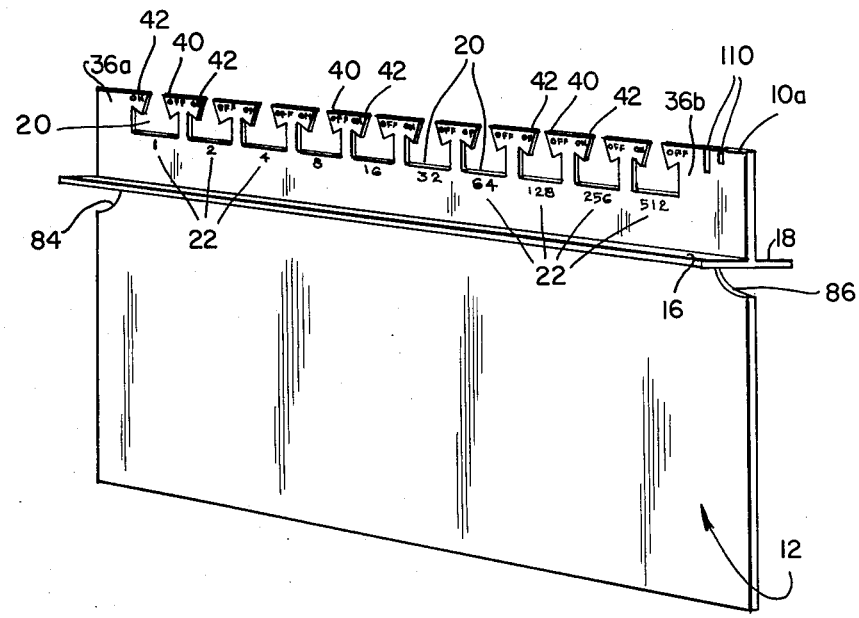
FIG. 6 is a perspective view of one of the file cards utilized in the assembly shown in FIG. 1.

FIG. 6 illustrates the structural detail of the novel file cards 12 used in the filing system of the present invention. Each of the cards 12 is preferably made of plastic or other sturdy and rigid material capable of carrying the records or other matter to be attached thereto by staples, tape or other suitable attachment means. The body of each file card 12 is in the form of a flat sheet which is rigid or semirigid, and is formed with perpendicular flanges 16, 18 projecting from opposite sides of the card body a short distance below the top end thereof. The flanges 16, 18 serve as spacers to control the distance between the card bodies when the file cards 12 are stacked within the file cabinet 10.

A plurality of angular notches 20 are cut in the top edge 12a of each file card 12. As shown in FIG. 6, 10 such notches are provided in an evenly-spaced row, and each notch 20 is assigned a binary value, as indicated at 22. As is well known, the binary values begin with a value of 1 and each succeeding binary value is double the amount of the preceding value. The values 22 assigned to the 10 notches 20 are therefore 1, 2, 4, 8, 16, 32, 64, 128, 256 and 512. Any selected number of notches may be provided, according to the capacity of the filing system. With the 10 notches, as shown by way of example, the file cards may be assigned consecutive numbers from 1 to 1023.

Figure 8:
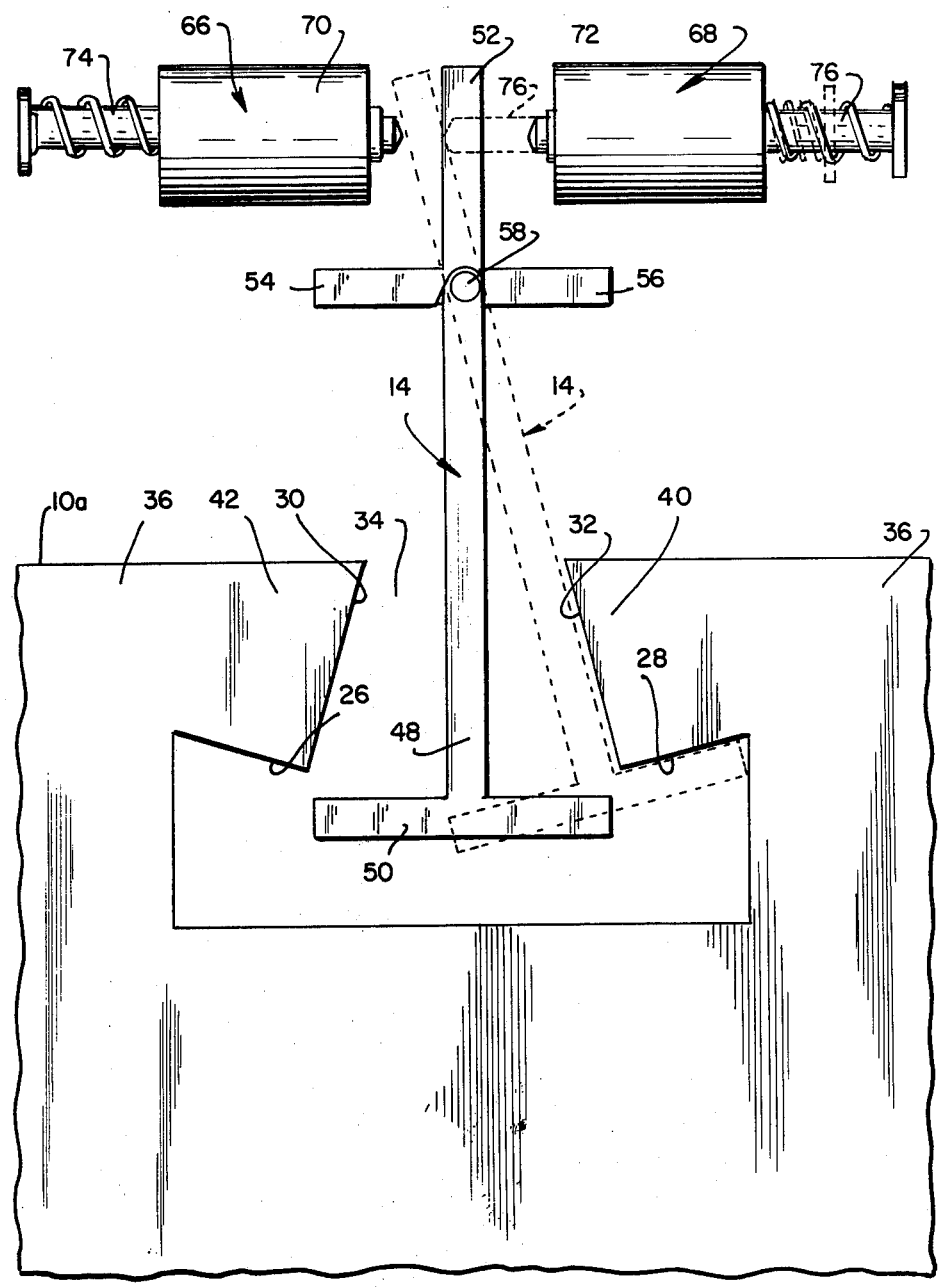
FIG. 8 is an enlarged, partially schematic elevational view showing the manner in which one of the swinging bar hooks cooperates with the notch of a file card through which it extends.

As clearly shown in FIG. 8 each notch 20 is formed with a rectangular lower portion 24, the upstanding side edges of which terminate in inwardly-extending and downwardly-inclined edges 26 and 28, which in turn terminate in inwardly-extending and upwardly-inclined edges 30 and 32. The edges 30 and 32 define therebetween an inwardly-tapered mouth 34 of the notch 20. The aforesaid configurations of the notches 20 define between each adjacent pair of notches an upstanding hook-retaining member 36 having a central upstanding stem portion 38 and a pair of opposed ears 40 and 42. The ear 40 is formed by the notch edges 28 and 32, while the ear 42 is formed by the notch edges 26 and 30. As will be presently explained, selected ears 40 and 42 are broken off to code the respective file card 12 with its assigned binary numeral, and for this purpose, the left-hand ear 40 0f each hook-retaining member 36 is marked "OFF", while the right hand ears 42 are marked "ON." The first notch 20 at the left-hand end of the row of notches defines an end hook-retaining member 36a which has only an "ON" ear 42. Similarly the last notch at the right-hand end of the row of notches defines an end member 36b which has only an "OFF" ear 40. It will be seen that the mouth 34 of each notch 20 is partially obstructed by an ear 40 at one side and an ear 42 at the other side.

Figure 7A:
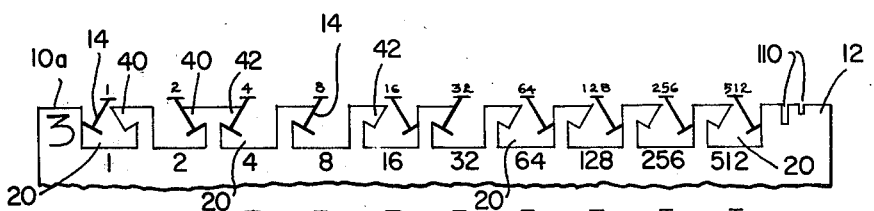
FIG. 7A to 7D are schematic views showing file cards coded with different binary numerals and the operative relationship between the swinging bar hooks and the file cards.
Figure 7B:
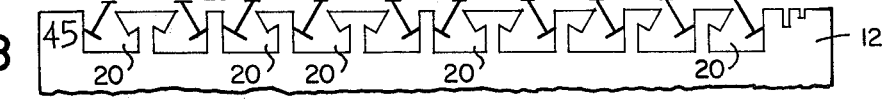
Figure 7C:
Figure 7D:
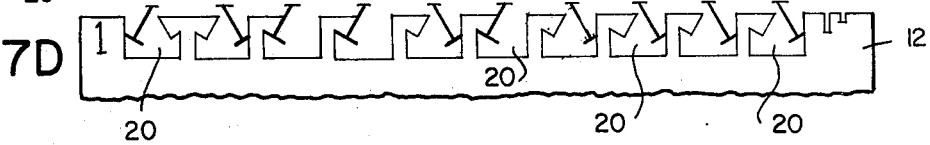

Each of the file cards 12 in the filing system is assigned a different individual number by means of which it can be identified and retrieved by operation of the apparatus of the present invention. To code the card with its assigned number, the number is reduced to its binary values and the "ON" ears 42 of the corresponding notches are cut or broken off. FIGS. 7A through 7D illustrates the manner in which such coding is performed for four different file cards, each having a different assigned number. FIG. 7A shows, by way of example, the manner in which a file card 12 is coded for the assigned number "3." For this purpose, the "ON" ears 42 overlying the two notches 20 with respective binary values of "1" and "2" (totalling "3") are cut off in alignmemt with the adjacent edge of the stem portion 38, in the manner shown in FIG. 7A. In addition, the "OFF" ears 40 overlying all of the other notches 20 whose binary values are not included in the assigned number are also cut off. The file card 12 shown in FIG. 7B is assigned the number "45", and to code this as a binary numeral, the "ON" ears 42 overlying the notches 20 with respective binary values of "1", "4", "8" and "32" are cut off, while the "OFF" ears 40 of the remaining notches are also cut off. In a similar manner, the file card 12 in FIG. 7C is coded for numeral "2" by cutting off the "ON" ear 42 overlying the single notch 20 with a binary value of "2" and cutting off the "OFF" ears 40 of all other notches. The file card 12 in FIG. 7D is coded for the numeral "1" by cutting off the "ON" ear 42 overlying the single notch 20 with a binary value of "1" and cutting off the "OFF" ears 40 of all other notches.

Figure 4:
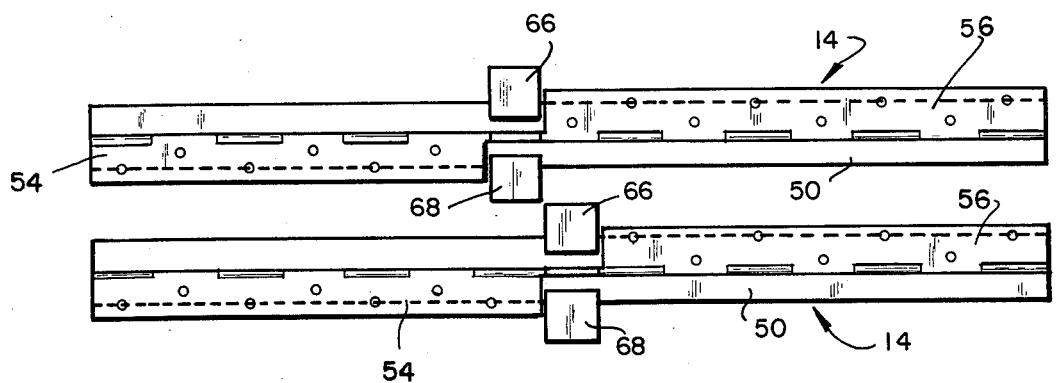
FIG. 4 is a top plan view of two of the swinging bar hooks utilized in the assembly of FIG. 1.
Figure 5:
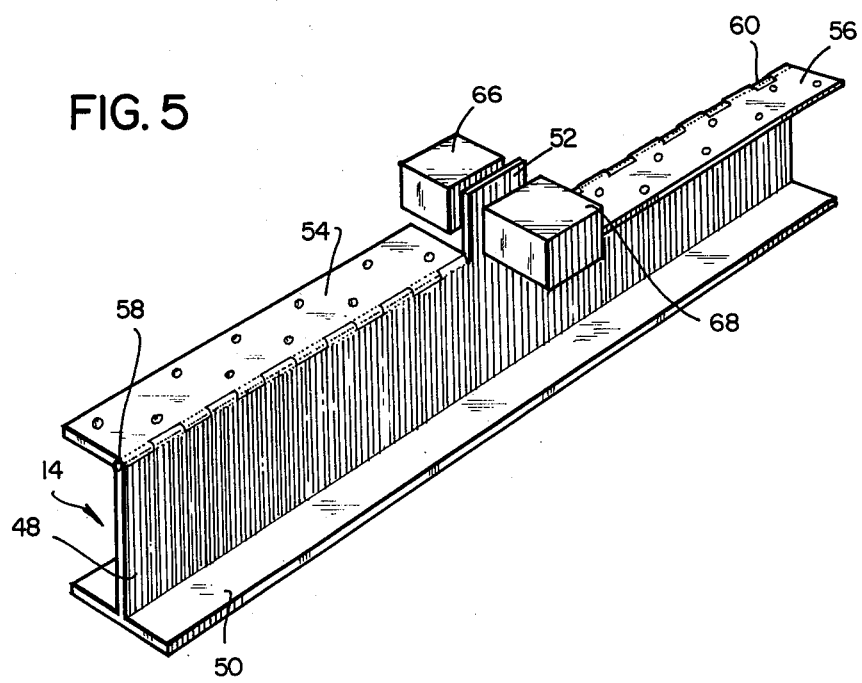
FIG. 5 is a perspective view of one of the bar hooks shown in FIG. 1, showing the relationship of the actuating solenoids therewith.

The file cards 12 are hung within the file cabinet 10 upon a plurality of swinging bar hooks 14 which extend longitudinally through the length of the cabinet. Each bar hook is made of steel or other strong metal, and has a cross-section of inverted T-shape, as shown in FIGS. 4 and 5. Each of the bar hooks 14 is thus formed with a vertically-extending arm 48 which terminates at its lower end in a horizontally-extending arm 50. The vertically-extending arm 48 is of a length substantially equal to the length of the cabinet 10, and intermediate its ends is formed with an upstanding tab 52. On opposite sides of the tab 52, a pair of elongated mounting bars or plates 54 and 56 are connected to the top edge of the vertical arm 48 by respective hinge pins 58 and 60. As shown in FIGS. 4 and 5, the mounting bars 54 and 56 are turned in opposite directions perpendicularly to the vertical arm 48, and in this position the mounting bars are secured to a recessed wall 62 in a frame 64 mounted in the cabinet 10 adjacent the top wall thereof, as shown in FIG. 1.

A bar hook 14 is provided for each notch 20 in the file cards to be received therein. In the illustrated embodiment in which the file cards 12 are provided with ten notches 20, ten bar hooks 14 are mounted in cabinet 10 in a horizontal row, and are spaced apart by distances corresponding to the spacing between the notches 20. Each of the file cards 12 is mounted on all of the bar hooks 14, horizontal arm 50 of each bar hook being received in a respective notch 20 in the manner shown in FIG. 1.

The upstanding tab 52 of each bar hook projects through an opening in the recessed wall 62 of frame 64, as shown in FIG. 1, and extends vertically between a pair of solenoids 66 and 68. These solenoids are operable to cause the respective bar hooks to swing in opposite directions about their hinged mounts to release a selected card, in a manner to be presently described. The upstanding tabs 52 are located at various distances along the lengths of the respective vertical arms 48 of bar hooks 14, so that the positions of the tabs and their associated pairs of solenoids 66 and 68 are staggered and the bar hooks can be closely spaced from each other in their horizontal row.

As shown in FIG. 8, the solenoids 66 and 68 of each pair comprise respective coil bodies 70 and 72 through which extend respective spring-loaded armature plungers 74 and 76. The plungers 74 and 76 are normally urged to retracted positions in which they are spaced from the bar hook tab 52 which extends centrally between them, as shown in solid line in FIG. 8. When the solenoid is energized, however, its plunger is propelled outwardly to an extended position in which it engages the tab. FIG. 8 shows in broken line the condition in which the solenoid 68 is energized and its plunger 76 extended so that engages tab 52 and pushes the latter to tilt the bar hook 14 in a counter-clockwise direction about hinge pin 58. In this tilted position of the bar hook, its bottom horizontal arm 50 engages the inclined edge 28 of the "OFF" ear 40 which overlies the notch 20 in which the bar hook 14 is located. Similarly, if the other solenoid 66 were energized, its plunger would be extended to tilt the bar hook in the opposite, or clockwise, direction, so that the horizontal arm 50 would move beneath the inclined surface 26 of the "ON" ear 42.

Figure 2:
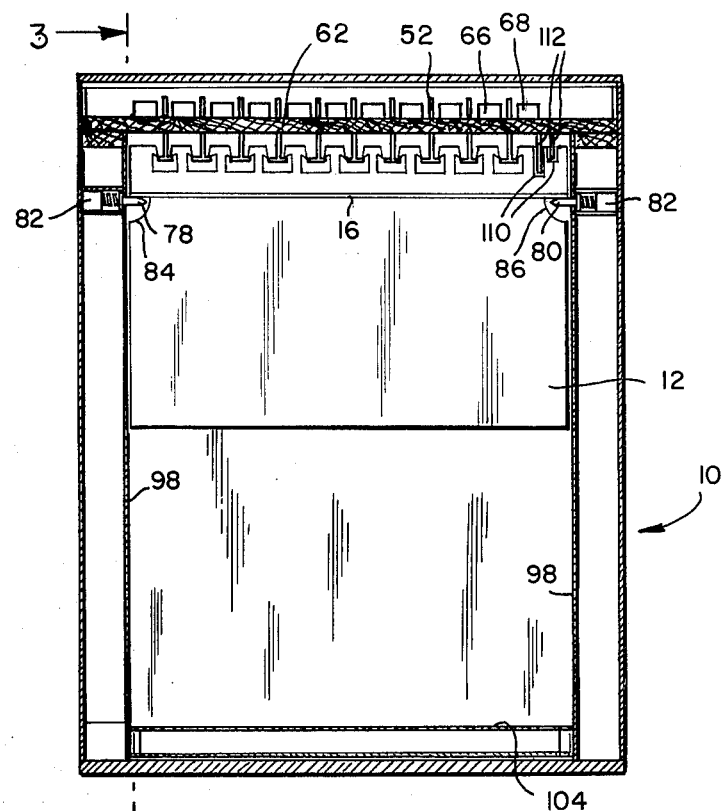
FIG. 2 is a section taken along line 2—2 of FIG. 1.
Figure 3:
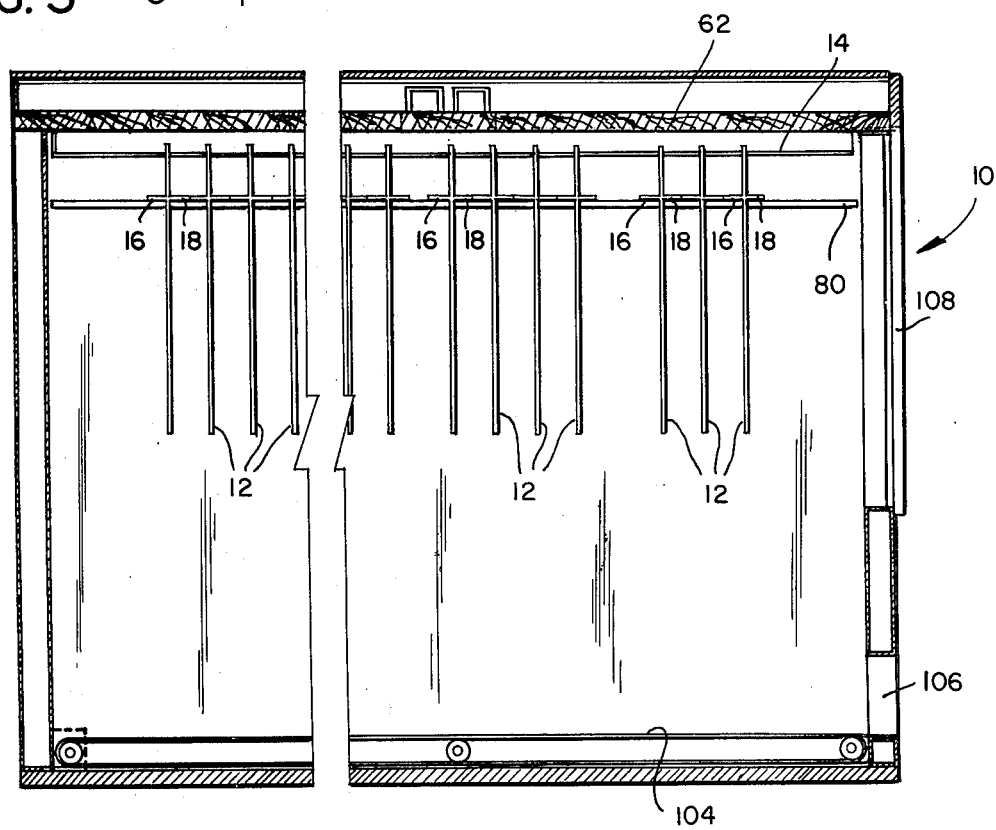
FIG. 3 is a section taken along line 3—3 of FIG. 2.

To permit the swinging movement of the bar hooks 14, means are provided to hold the file cards 12 slightly elevated relative to the bar hooks so that the horizontal arm 50 of each bar hook is centered within the respective notch 20 of each file card, and does not touch any of the edges of the notch, in the manner shown in FIG. 8. Such holding means comprises a pair of elongated, solenoid-operated latch bars 78 and 80 extending along the sides of the cabinet 10, each latch bar being connected to and controlled by two or more solenoids 82. The file cards 12 are each formed with an arcuate notch 84, 86 in each side edge directly beneath the card flange 16 and the latch bars 78 and 80 extend into these notches 84 and 86 and support the file cards 12 in a slightly elevated position relative to the bar hooks 14, as shown in FIG. 2.

FIGS. 9, 10 and 11 illustrate the structural details of the latch bar 78 and its associated solenoids 82, it being understood that the other latch bar 80 is of identical construction, and the following description will also apply thereto. The latch bar 78 has an elongated plate-like body 88 having an angular leading edge 90 and terminating at its opposite side in a perpendicular flange 92. The plunger 94 of each of a plurality of solenoids 82 is secured to the flange 92, and a spring 96 urges the plunger 94 to a normally-extended position outwardly of the body of the solenoid 82, as shown in FIG. 9. In this extended position, the plunger 94 projects through an inner wall 98 of the file cabinet 10, and into the notch 84 of each file card 12. When the solenoids 82 are energized, the plunger 94 is drawn into the body of the solenoid, moving the latch bar 78 out of engagement with the file cards and through the inner wall 98, as shown in FIG. 10. In the normal extended position of FIG. 9, the latch bars 78 and 80 project into the respective arcuate notches 84 and 86 of all the file cards 12 and support the file cards in mounted position, while the bar hooks 14 are unencumbered and free to swing. When the solenoids 82 are simultaneously energized, the latch bars 78 and 80 are drawn to their retracted positions of FIG. 10, out of engagement with the file cards 12, and the file cards are now supported by the bar hooks, which have been tilted.

The swinging movement of the bar hooks 14 is selectively controlled by a number coding device 100 (FIG. 1) in the nature of an electrical adding machine to which a release latch key 102 is added. The adding machine has a plurality of keys which may be depressed to feed in the binary numeral of the selected file card 12 to be released from its mounted position within the cabinet 10. The coding device 100 is connected by a multi-lead cable 103 to the pairs of solenoids 66, 68 associated with each of the bar hooks 14. Each of the bar hooks 14 is assigned a binary value corresponding to the binary value of the particular notch 20 in the file cards 12 through which it extends as indicated in FIG. 7A. According to its binary value, each bar hook 14 is selectively swung either to the right in a counterclockwise direction for "OFF," or to the left in a clockwise direction for "ON." Thus if the file card 12 in FIG. 7B, having a binary value of 45 is selected to be released and removed, the binary numeral 45 is fed to the coding device 100. The coding device is then effective to swing each of the bar hooks in a direction determined by the presence of its assigned binary value in the binary numeral 45. It will thus be observed in FIG. 7B that the first, third, forth and sixth bar hooks in the horizontal row are swung to the left to the "ON" positions in FIG. 7B, these bar hooks having assigned respective binary values of 1, 4, 8, and 32, for a total value of 45. The remaining bar hooks are all swung to the left to the "OFF" position. In these tilted positions, the bar hooks are so arranged that each of their lower horizontal arms 50 engages a side of its respective file card notch 20 at which either the right "ON" ear 40 or the left "OFF" ear 42 has been cut off. Since no ear 40 or 42 overlies any of the horizontal arms 20 of the tilted bar hooks 14, the card 12 is no longer capable of being supported by the bar hooks, and when the release latch key 102 of the coding device 100 is depressed, the latch bars 78 and 80 are retracted, and the selected file card 12, having an assigned value of 45, is released to drop to the bottom of the cabinet 10.

On the other hand, none of the other file cards 12 having different binary coded numerals, are released during the above operation. FIGS. 7A, 7C, and 7D show cards 12, by way of example, having assigned numerals of 3, 2 and 1 in their relationship to the 10 bar hooks 14 which have been tilted to represent the same binary numeral 45. It will be seen that with respect to each of these file cards, at least several of the bar hooks are tilted in such a direction that their horizontal arms 50 underlie uncut ears 40 or 42 on these cards, so that the cards are supported by these bar hooks and cannot be released when the latch bars 78 and 80 are retracted. It will be appreciated that when one of the file cards is selected for release by feeding its binary numeral to the coding device, the bar hooks are swung in such directions that at least one bar hook will underlie an uncut ear of each of the other file cards, so that only the selected file card will be released and all of the other file cards will be supported by the bar hooks.

The array of file cards 12 are closely stacked within the cabinet 10, as shown in FIG. 1, in any order. The file cards need not be inserted in chronological order, but may be inserted in random order as they are removed and replaced. The selected swinging action of the bar hooks will release a selected file card regardless of its position within the cabinet. When the user wishes to remove a selected file from the cabinet, he enters the assigned binary numeral of the card in the coding device 100 and presses the release latch key 102, causing the selected file card to be released and dropped upon a conveyor belt 104 at the bottom of the cabinet, the conveyor belt transporting the selected file to an outlet opening 106 at the front of the cabinet. At its front end, the cabinet 10 may also be provided with a swinging door 108 which may be opened to insert or replace file cards 12 on the latch bars 78, 80 and bar hooks 14. The inner side walls 98 of cabinet 10 are closely spaced from the sides of the mounted file cards 12, so that if, during operating, a file card is supported by only one bar hook 12, it will not swing or tilt, but will remain in horizontal position.

To insure that a removed file card is replaced in its proper storage cabinet, each file card 12 is provided with a plurality of cut-out slots 110 at one end of its top edge 12a, as shown in FIGS. 6 and 7. These cut-out slots 110 are identical for each of the file cards for one file cabinet 10, but differ in number, length and position on the cards to be stored in other file cabinets, so that the slots constitute cabinet coding means which enable the cards to be inserted only in their designated file cabinet. When a file card 12 is inserted in its cabinet 10, depending identification bars 112 of selected size and position fit snugly in the coded slots 110 only if the file card 12 is intended for storage within the file cabinet in which the identification bars 112 are mounted. If an attempt is made to insert a card from a different cabinet, the bars 112 will block passage of the card into the cabinet.

FIG. 12 illustrates a modified form of file card 114 which mounts a container 116 for conventional reels of magnetic tape, microfilm or the like. The projecting flanges 16 and 18 are of such width that they maintain the supported containers 116 properly spaced from each other and out of contact with each other.

Figure 14:
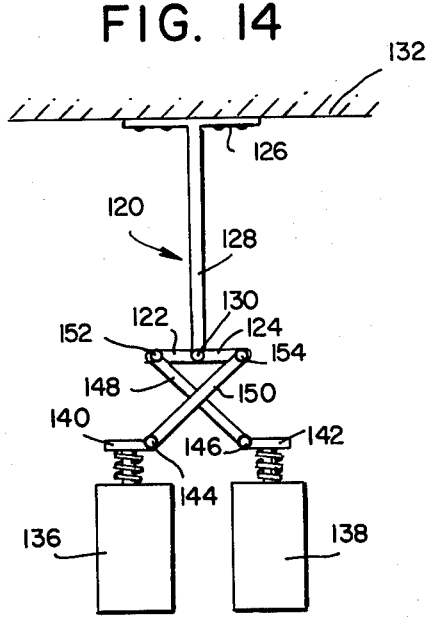
FIG. 14 is a schematic elevation showing the manner in which the bar hook of FIG. 13 is mounted and actuated by a pair of solenoids.
Figure 13:
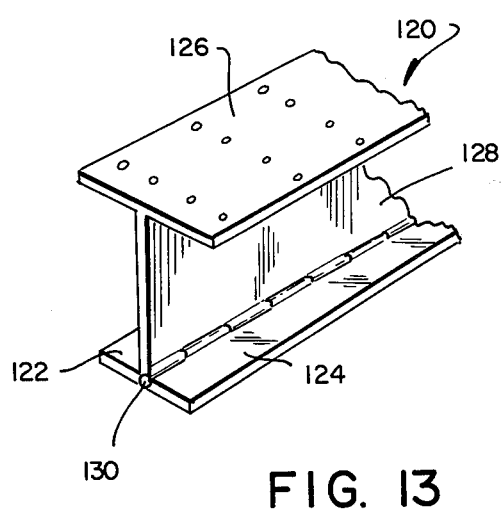
FIG. 13 is a perspective view of a portion of a modified form of bar hook made in accordance with the present invention.
Figure 15:
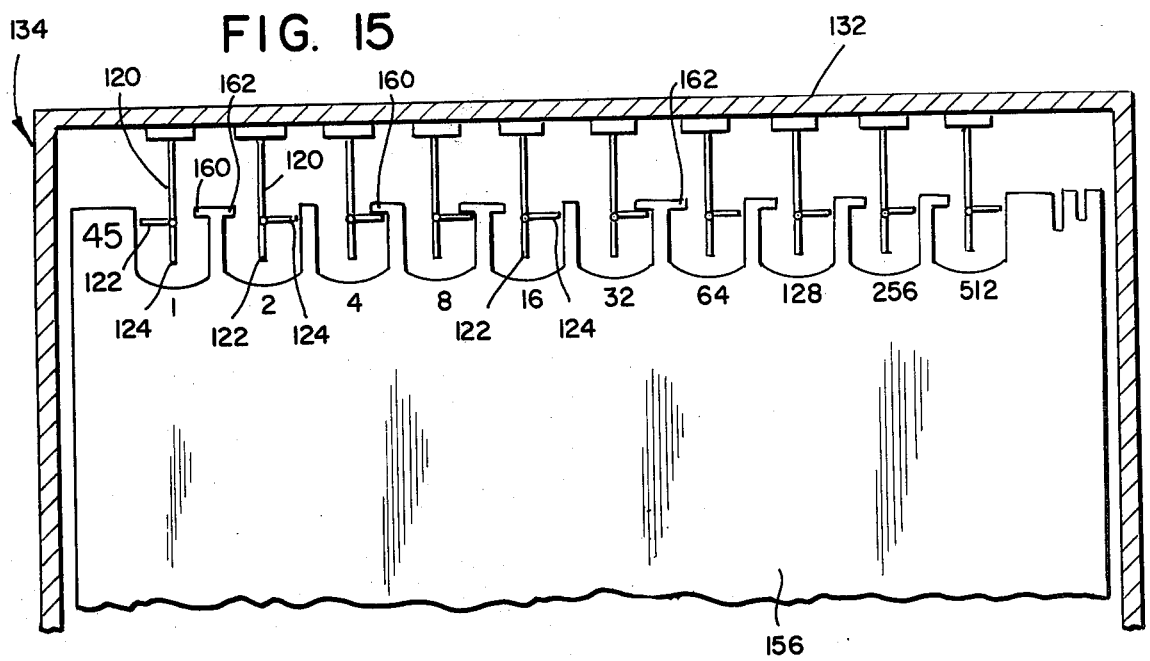
FIG. 15 is a sectional view through a file cabinet showing the manner in which the bar hooks of FIG. 13 support the file cards therein.

FIGS. 13, 14 and 15 illustrate a modified form of bar hook 120 made in accordance with the present invention, and intended for use where lightweight files are to be stored and supported. In this instance the bar hooks 120 are not themselves swingable, but their support arms 122 and 124 are hingedly mounted and individually foldable to retracted positions.

Each bar hook 120 is of T-shaped cross section, having a top horizontally-extending section 126 from the center of which an integral perpendical section 128 extends vertically. The support arms 122 and 124 are hinged to the lower end of the vertical section 128 by a common hinge pin 130. As shown in FIG. 14, the top support section 126 is rigidly secured flat against the top wall 132 of cabinet 134. The hinged support arms 122 and 124 normally extend horizontally from the vertical section 128, as shown in FIGS. 13 and 14. A pair of solenoids 136 and 138 are provided for actuating each bar hook 120, the solenoids being mounted at the rear end of the cabinet 134. The solenoid 136 has a spring-loaded armature plunger 140 connected by pivot 144 to a link 150 which is in turn connected at pivot 154 to the end of support arm 124. The solenoid 138 has a spring-loaded plunger 142 connected at pivot 146 to a link 148 which crosses the link 150 and is connected at pivot 152 to the end of support arm 122. When the solenoid 136 is energized, it draws the plunger 140 downwardly to a retracted position so that it lowers the support arm 124 to a vertical position aligned with and depending from the vertical section 128. Similarly, when the solenoid 138 is energized, its plunger 142 is retracted causing link 148 to lower support arm 122 to a vertical depending position.

The support arms 120 are adapted to mount a plurality of index cards 156 which are similar to the index cards 12 previously described except that their cut-out notches 158 are somewhat differently shaped, and the "OFF" ear 160 and "ON" ear 62 overlying each notch are of rectangular shape, so that the inclined ear edges of the cards 12 are eliminated. In this embodiment, the index cards 156, when inserted in the cabinet 134, are supported entirely by the horizontally-extending arms 122 and 124 of the bar hooks 120, as shown in FIG. 15, and the latch bars of the previous embodiment are eliminated. In addition, the inner walls of the previous embodiment are not required, so that the over-all size of the cabinet 134 is reduced.

The operation of the arrangement shown in FIGS. 13, 14 and 15 is essentially similar to that described for the previous embodiment. When a selected binary number is keyed to the coding device, the latter causes energization of the solenoids 136 and 138 of each bar hook 120, causing either the right support arm 122 or the left support arm 124 of each bar hook to turn downwardly to a vertical position and out of engagement with the ear which it may have been supporting. If the binary positions of the actuated bar hooks matches the binary numeral coded on one of the index cards, that one card will be released and dropped while all the other remain supported by at least one bar hook support arm.

The index card 156 shown in FIG. 15 has an assigned number 45, and has been so coded by cutting off the "ON" ears 162 overlying the first, third, fourth and sixth notches 158 which have respective binary values of 1, 4, 8 and 32, for a total of 45, and also cutting off all of the "OFF" ears of the remaining notches. The bar hooks 120, however, are shown in actuated positions representing a binary numeral one, the first bar hook to the left having its support arm 124 lowered, while the other bar hooks have their support arms 122 lowered. The index card 156 illustrated in FIG. 15 is therefore still supported by some of the horizontally-extending support arms underlying the uncut ears, since its assigned binary numeral does not match the binary numeral fed to the bar hooks 120.

FIGS. 16 and 17 illustrate a further modified form of bar hook 200 fabricated as an inverted "T" with a vertical arm 202, and a horizontal arm 204 having support portions 206, 208, for co-action respectively with the "ON" and "OFF" ears. A pair of swing pins 210, 212 serve to rockably mount bar hook 200 in file cabinet 10.

In FIG. 18 a bar hook 230 is formed as a modified "H" with a vertical arm 232, a lower horizontal arm 234 having support portions 236, 238, and an upper horizontal arm 240. A pair of swing pins 242, 244 serve to rockably mount bar hook 240 in file cabinet 10.

In FIG. 19 a bar hook 200-a is shown in an unoperated position with respect to an "ON" ear 250 of a file card 252. Bar hook 200-b is shown actuated to its "OFF" position with its support portion 208 disposed beneath an "OFF" ear 254; while bar hook 200-c is shown actuated to its "ON" position with its support portion 206 disposed beneath an "ON" ear 256.

The bar hook 230 of FIG. 18 would be disposed and positioned for cooperation in a manner similar to that shown for bar hooks 200-a, 200-b and 200-c. The showing of bar hook 230 at the rightmost side of FIG. 19 is for example only as it is not contemplated that bar hooks 200 and 230 would be mixed in any single installation.

An upper extremity 260 of each bar hook 200, and upper horizontal arm 244 of bar hook 230, are disposed between opposed pairs of cam plates 262 (FIGS. 19 and 20) which co-operate therewith to swing bar hooks 200 and 230 into their respective actuated positions.

Each cam plate 262 is formed with two cam surfaces 264 (FIG. 20) spaced along their lengths; each disposed for co-action with a cam pin 266 vertically disposed in a cam track 268 formed on each side of cam plate support blocks 270, also supported in file cabinet 10.

At least one spring 280 (FIG. 20) having one of its ends secured to support block 270 and its other end secured to a cam plate 262, urges its respective cam plate into its unactivated position (as shown for cam plates 262-b, 262-c, and other similarly disposed in FIGS. 19 and 20). Cam plates 262 may be moved from their un-activated positions to activated positions (as shown for cam plates 262-d and 262-e) by the application of a suitable force applied in the direction of arrow A (FIG. 20). This force may be applied by a solenoid (suitably mounted and attached to cam plate 262) activated from a suitable source such as coding device 100 (FIG. 1). The source may also be manually applied by suitable links and/or levers secured to cam plates 262 and extending from blocks 27 into reach of the operator.

Cam plate 262-d is shown in its actuated condition. With the application of the force in the direction of arrow A (FIG. 20) cam surface 264 thereof acts against cam pin 266 causing cam plate 264 to move towards bar hook 200-b to rock same in the counter clockwise direction (FIG. 19) to position its support portion 208 under "OFF" ear 254. In similar manner cam plate 262-e has been actuated to rock bar hook 200-c in the clockwise direction to position its support portion 206 beneath "ON" ear 256. In similar manner cam plates 262-g and 262-h are disposed for co-action with upper horizontal arm 244 of bar hook 230.

In FIGS. 21 through 23 a further modified form of latch bar assembly 300 is shown for co-operation with side notches 302 formed in card file 304. Each latch bar 310 includes a securing plate 312 suitably secured to the wall of file cabinet 10, and a card support plate 314 rockably attached to securing plate 310 by a hinge 316 and extending for a length at least equal to the depth of the card file 304 to be stored in file cabinet 10. A cam plate 310 (similar to cam plate 262 of FIGS. 19 and 20) is disposed for co-action with support plate 314. Each cam plate includes a pair of cam surfaces 320 disposed for co-action with cam pins 322 (FIG. 23) vertically disposed in cam slots 324 of file cabinet 10. A suitably secured spring 326 urges cam plate 310 in the direction of arrow X (FIGS. 21 and 23) while a force application means is secured to cam plate 310 to draw same in the direction of arrow A (FIG. 22). The force means may either be a solenoid or links or levers as described for FIGS. 19 and 20.

Upon the application of force to draw cam plate 310 in the direction of arrow A its cam surface 320 will coact with cam pins 322 and cam plate 314 will also rock in the clockwise direction (FIG. 21) about hinge 316. This action will move card support plate 314 up to its card support position of FIG. 23 wherein plate 314 seats in notches 302 of card 304 to support card 304 up out of co-action with their bar hooks (not shown) used in the selection process for card 304. It should be remembered from the previous description that there is a latch bar assembly 300 on each side of card 304 and that when actuated into co-operation with card 304 they facilitate the bar hook selection process. Release of cam plate 310 permits spring 326 to act upon same to draw same in the direction of arrow X permitting support plate 314 to rock counterclockwise about hinge 316 to release cards 304 for co-operation with their respective bar hooks.

FIGS. 24 through 27 show another modified form of latch bar assembly 350 carried by cabinet 10. Here a card support plate 352 is hingedly mounted at 354 to a securing plate 356 approximately attached to cabinet 10. A cam plate 360 is suitably mounted to cabinet 10 so that its cam surface 362 (FIGS. 25 and 27) co-operate with cam pins 364, and so that its operating edge 366 acts upon support plate 352. A spring 370 acts upon cam plate 360 to urge same to its un-actuated position; while suitable force applying means 372 (such as a solenoid or operator actuated links or levers) when actuated will move cam plate 360 to its actuated position (FIGS. 26 and 27).

A similar cam plate type latch bar assembly 400 is shown in FIGS. 28 and 29. In this modified form a card support plate 402 is hingedly connected at 404 to a securing plate 406 suitably attached to a horizontal wall 408 of cabinet 10. A cam plate 410 (similar to the cam plates of FIGS. 21 through 27) is suitably secured to cabinet wall 408 and card support plate 402. Cam plate 410 is formed with suitable cam surfaces (not shown) disposed for co-action with cam pins 412 (FIG. 29).

It should again be remembered that there is a latch bar assembly 400 on each side of cabinet 10.

FIG. 30 shows a drive assembly 450 for conveyor belt 106. A motor 452, conventionally available and of a suitable characteristics is secured in cabinet 10. The output shaft 454 of motor 452 drives a pulley 456 about which is entrained a belt 458 that transmits the drive power to a pulley 460 carried by a shaft 462 which, in turn, transmits the power to belt drive pulley 464 that drives belt 106. Suitable idler pulleys 466 are disposed in cabinet 10 to support the intermediate portions of belt 106.

An alternate drive system 500 is shown in FIGS. 31 and 32 for belt 106. The entire system 500, including conveyor belt 106, is carried by a carriage structure 502 which is disposed for sliding into and out of cabinet 10 (not shown) to facilitate service of the equipment. A motor 504 is disposed on an upper plate 506 at carriage 502. An output shaft 508, of motor 504 fixedly carries a drive pulley 510 about which a entrained a belt 512 which transmits the power to a driven pulley 514. A driven shaft 516 suitably disposed on carriage 502 transmits the power from pulley 514 to belt pulley 518 which, in turn, transmits the power to conveyor belt 106.

An alternative drive assembly 550 is shown in FIG. 33 for belt 106. The output of a motor 552 drives a belt 554 to transmit the drive to a pulley 556 secured to a shaft 558. The other extremity of shaft 558 has a worm gear 560 formed thereon and disposed for co-action with a gear 562 fixed to a shaft 564 to transmit the power to belt pulley 564 to drive belt 106.

It will be understood that the file cards of the present invention may be made of sturdy plastic or cardboard for the purpose of mounting selected records thereon, or may themselves have record material printed or written on their surfaces. The cards may also be made of transparent material and serve as micro fiche films or the like.

While preferred embodiments of the invention have been shown and described herein, it is obvious that numerous omissions, changes and additions may be made in such embodiments without departing from the spirit and scope of the invention.

What is claimed is:

1. A record filing assembly comprising in combination:
   a stationary support member,
   a plurality of elongated file element selecting members mounted in a horizontal row on said support member and depending therefrom,
   a plurality of file elements mounted in alignment in a horizontal row beneath said support member, each of said file elements having a series of holding portions arranged in a row along its upper end, with said holding portions representing progressive binary values, each of said elements having an individual assigned number, each of said holding portions having an "ON" location at one side thereof and an "OFF" location at the other side thereof, and holding means overlying the "OFF" location of those holding portions whose binary values are included in the assigned number of an element, and overlying the "ON" locations of the remainder of the holding portions on said element,
   each of said element selecting members extending through the holding portions of each of said file elements having the same binary value,
   each of said element selecting members including a pair of opposed retaining portions and being actuatable for alternative movement to a first actuated position in which one retaining portion underlies said "ON" location and the other retaining portion is clear of the "OFF" location, and a second actuated position in which said one retaining portion is clear of said "ON" location and the other retaining portion underlies said "OFF" location, said file element selecting members further comprising plurality of bar hooks each having a vertically extending body member and said opposed retaining portions comprising first and second support arms projecting horizontally from said body member, with said body member being rockably supported to said support member, and actuating means for moving all of said element selecting members simultaneously in a selected sequence in which at least one selecting member is moved to the first actuated position and the remaining members are moved to the second actuated position whereby to release one file element whose assigned number corresponds to said sequence.

2. A second filing assembly according to claim 1 wherein said element is a card.

3. A record filing assembly according to claim 2 in which the holding portions of said file cards comprise a series of notches arranged along the upper edge of each file card, each notch representing a progressive binary value, and in which said holding means comprises a first ear overlying the "OFF" location at one side of each notch whose binary value is included in the assigned number of its respective file card, and a second ear overlying the "ON" location of the remainder of the notches on said card.

4. A record filing assembly according to claim 3 in which said actuating means comprises solenoid means for moving each bar hook alternatively to said first and second actuated position.

5. A record filing assembly according to claim 4 in which each of said bar hooks is movable to said first actuated position in which said first support arm is located in a support position beneath the second ear of its corresponding notch at the "ON" location, and the second support arm is positioned remote from said first ear at the "OFF" location, each bar hook being also movable to said second actuated position in which the second support arm is located in a supporting position beneath said first ear of its corresponding notch at the "OFF" location, and the first support arm is positioned remote from said second ear at the "ON" location.

6. A record filing assembly according to claim 5 in which said support arms are rigid with said body member and each bar hook is pivotally mounted on said stationary support member for alternative swinging movement to its first and second actuated positions.

7. A record filing assembly according to claim 6 which also includes retractable latch means normally engaging recesses in said file cards and supporting said file cards on said support member, and solenoid means for retracting said latch means out of engagement with said file cards after said bar hooks have been actuated to move to their respective first and second actuated positions, whereby to release one selected file card whose assigned number corresponds to the selected sequence of movement of said bar hooks.

8. A record filing assembly according to claim 5 in which said support arms are pivotally mounted on the body member of each bar hook, the support arms in their normal horizontal positions extending beneath and engaging the first and second ears of their corresponding notches to support the file cards on said support member, the second support arm being movable to a vertical position depending from said body member and out of engagement with said first ear in the first actuated position of said bar hook, and the first support arm being movable to a vertical position depending from said body member and out of engagement with said second ear is the second actuated position of said bar hook.

9. A record filing assembly according to claim 8 in which a pair of solenoids are operatively coupled to the respective support arms, said solenoids being alternatively energized by said actuating means for moving its coupled support arm to said vertical position.

10. A record filing assembly according to claim 2 in which said stationary support member comprises an enclosed file cabinet having a front open end said file cards being mounted vertically in a horizontal row within said file cabinet with the side edges of said file cards closely spaced from the inner wall surfaces of said file cabinet.

11. A record filing assembly according to claim 10 in which said file cabinet includes conveyor means at the lower end thereof for receiving a file card released by said card selecting members and transporting said file card to the front open end of said file cabinet.

12. A record filing asembly according to claim 1 in which all of the file cards for a particular support member are formed with one or more identification notches having a predetermined configuration and disposed for co-action with one or more identification bars of a configuration corresponding to said predetermined configuration and carried by said support member so as to receive only those file cards with said corresponding identification notches.

13. A record filing assembly according to claim 2 in which a pair of support plates each extending in a different direction rockably support each bar hook, said pair of support plates together extending substantially the full extent of said vertically extending body member.

14. A record filing assembly according to claim 2 in which said actuating means for each of said selecting members comprising at least one cam plate for each of said selecting members disposed for sliding movement in the direction of the longitudinal extent of said body member thereof and for cam action movement toward and into engagement with said body member to move same to either said first actuated position or said second actuated position.

15. A record filing assembly according to claim 2 in which there is a pair of cam plates for each elongated card selecting member one coacting with one side of said body member thereof to move same toward said first actuated position, and the other coacting with the other side of said body member thereof to move same toward said second actuated position.

16. A record filing assembly according to claim 15 in which each cam plate is biased toward an unactuated position, and selectively operated actuating means are provided for each of said cam plates to move same in the direction of longitudinal extent of said selecting members during which movement the cam action will occur to move said cam plates into co-operation with their respective selecting members.

17. A record filing assembly according to claim 2 in which each of said file cards has a first support notch formed in a first side edge thereof disposed for co-action with a first latch bar extending along said first side edges of all said file cards and a second support notch formed in a second side edge thereof disposed for co-action with a second latch bar extending along said second side edge of all said file cards, said first and second latch bars engage said notches to support said cards out of contact with said selecting members and release positions wherein said cards move into position to coact with said selecting members and a cam plate disposed for coaction with each of said latch bars to move same to said support position.

18. A record filing assembly according to claim 17 in which said latch bars are disposed for movement between a horizontally extending support position and a vertically extending release position.

19. A record filing assembly according to claim 17 in which said latch bars are disposed for movement between a horizontally extending support position and a downwardly tilted release position.

20. A record filing assembly according to claim 17 in which said latch bars are disposed for movement between a vertically disposed release position and a downwardly tilted support position.

* * * * *